Patented Nov. 6, 1934

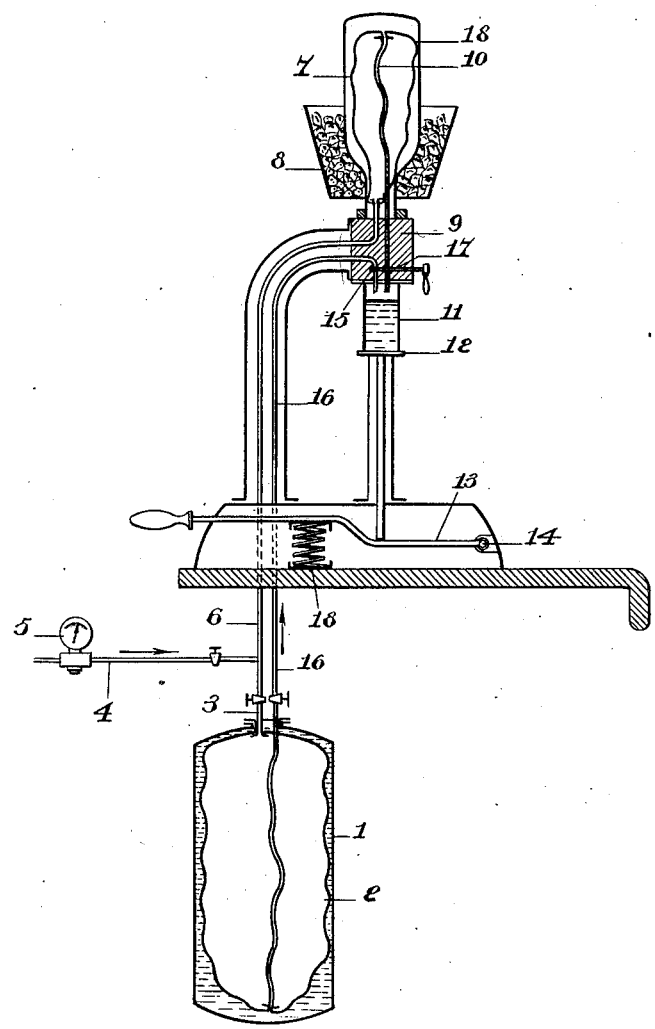

1,979,605

UNITED STATES PATENT OFFICE 1,979,605

METHOD AND APPARATUS FOR DISPENSING GAS CONTAINING BEVERAGES AND THE LIKE

Eugène Charmat, Paris, France

Application January 14, 1931, Serial No. 508,771
In France January 28, 1930

8 Claims. (Cl. 225—11)

Gas-containing beverages are maintained under pressure to conserve the gases with which they are saturated and often even super-saturated. When these liquids are discharged in the open air into a glass for consumption it is observed that owing to the sudden diminution of pressure and the agitation produced, there is a considerable liberation of gas which causes an exaggerated frothing of the liquid during the filling of the glass which is thus rendered difficult, and causes an almost instantaneous disappearance of the gas from the beverage which immediately loses all effervescence.

The present invention has for its object to suppress this inconvenience and consists in maintaining the liquid under pressure during the whole filling of the vessel whereby the liquid will be served to the consumer with the minimum loss of gas.

Preferably the placing of the glass or the like under pressure is effected by the aid of a fluid under pressure not in contact with the liquid to be dispensed.

The invention also covers the apparatus for carrying out the method above described; in this apparatus the conduit for the liquid under pressure and the reserve container on one hand, are put into communication with an intermediate container the atmosphere of which is in connection with the glass to be filled.

In particular the fluid under pressure is separated from the liquid in the reserve container and if desired from the atmosphere in the intermediate container, by a membrane or other mobile wall.

By way of example an apparatus according to the present invention, designed for dispensing sparkling wine into glasses for consumption has been illustrated in the annexed drawing.

The apparatus illustrated comprises a reserve container 1 in which the sparkling wine to be dispensed is stored under pressure. In this container is disposed a deformable membrane 2 of which the interior is in communication by a conduit 3 with the water main 4 furnished if necessary with a pressure reducer 5. This water main supply 4 is also in communication through a conduit 6 with the interior of a membrane 18 located within an auxiliary container 7 formed in the present case by a simple magnum champagne bottle, inverted and surrounded by an ice bath 8 in the form of a champagne cooling bucket. The container 7 rests on a joint making block 9. A tube 10 rising to the upper part of the container 7 puts the atmosphere of this container in communication with that of a glass 11 placed beneath the block 9. The glass, placed on a movable platform 12 is pressed against the packing 15 of the block 9 by a lever 13 pivoted on an axis 14 and urged upwards by a spring 18. In addition the glass 11 is in communication with the reserve container 1 by a conduit 16. A cock 17 enables the glass 11 to be disconnected from the reserve container 1, or from the atmosphere of the container 7 or from both together.

The apparatus operates as follows:

If it is desired to fill the glass 11 with sparkling wine from the container 1, the glass 11 is put in position and the container 7 put in communication with the conduit 4 which supplies water to the container 7 and raises the atmosphere therein to a pressure sensibly equal to that under which the sparkling wine in the container 1 stands. Through the tube 10 the atmosphere of the glass 11 is at a pressure sensibly equal to the pressure of the atmosphere of the container 7 and in consequence to that of the sparkling wine in the container 1, from the moment the cock 17 is turned to put the atmosphere of the container 7 into communication with that of the glass 11. When the cock 17 opens the conduit 16 the sparkling wine flows into the glass 11 under the pressure of the column of liquid which separates the level of the water in the container 7 and that of the gas-containing beverage in the glass 11; the membrane 2 is expanded to take the place of the liquid dispensed by the water from the mains, or if this is cut off, from the container 7.

The sparkling wine is thus dispensed into the glass under a pressure sensibly equal to that at which it is held in the container 1, and, in consequence, there is no gaseous discharge as normally happens with the present liquid dispensing devices. The glass 11, once filled with wine not having lost any of its gas during filling is presented to the customer at the exact moment when the froth begins to form, and in consequence at the moment when the liquid is still saturated, that is to say under the best conditions for presentation and consumption.

Several modifications in detail can be made in the device above described, in particular the membrane 18 of the container 7 can be omitted, when the water from the main would fill the lower part thereof and compress the atmosphere. Also the beverage to be dispensed could be caused to rise directly in the container 7 by a suitable set of valves and conduits and then be discharged into the glass 11.

It should be mentioned that not only can the main water supply be used, but any compressed fluid such as illuminating gas, compressed air, and so forth.

Having now particularly described and ascertained the nature of my said invention and in what manner the same is to be performed, I declare that what I claim is:

1. A dispensing apparatus for liquids comprising a container for the liquid to be dispensed, a second container for a gas, a source of pressure, conduits connecting said source to each of said containers, conduits leading from said containers to a vessel to be filled and a valve interposed in said conduits so that the pressure of the air in the vessel may be raised to substantially the pressure of the liquid to be dispensed therein before said liquid is dispensed.

2. An apparatus for dispensing liquid comprising a container for the liquid, a second container for a gaseous fluid, a source of pressure, conduits connecting said source to each of said containers, conduits leading from said containers to a vessel to be filled, valves interposed in said conduits so as to place the air in said vessel under pressure before dispensing the liquid thereto and sealing means for the opening in said vessel carried by said valve.

3. An apparatus for dispensing liquids comprising a container for the liquid to be dispensed, a second container for a gaseous fluid, flexible sacks disposed within said containers, conduits connecting said flexible sacks to a source of fluid under pressure so that upon the inflation of said sacks said liquid and said gaseous fluid will be placed under substantially the same pressure, except for the differences in pressure due to the different levels of said container conduits leading from said containers to a vessel to be filled and valves interposed in said last-mentioned conduits.

4. An apparatus for dispensing liquids comprising a container for the liquid to be dispensed, a second container for a gaseous fluid, flexible sacks disposed within said containers, conduits connecting said flexible sacks to a source of fluid under pressure so that upon the inflation of said sacks said liquid and said gaseous fluid will be placed under substantially the same pressure, except for the differences in pressure due to the different levels of said container, conduits leading from said containers to a vessel to be filled, valves interposed in said last-mentioned conduits and sealing means for sealing the opening in the vessel to be filled during the filling thereof.

5. A dispensing apparatus for liquids comprising a container for the liquid to be dispensed, a second container for a gas, means for placing said liquid and said gas under substantially the same pressure except for difference in pressure of levels of said containers, conduits leading from said containers to a vessel to be filled, valves interposed in said conduits so that the pressure of the air in the vessel may be raised to substantially the pressure of the liquid to be dispensed therein before said liquid is dispensed and means for cooling said container containing said gas.

6. A process for dispensing liquids under pressure comprising placing the receptacle to be filled under pressure of a gas from a container having a constant volume, then dispensing liquid into said receptacle under pressure and then returning said gas from said receptacle to said container to reestablish therein substantially the same pressure as existed before the liquid was dispensed into said receptacle.

7. A process for dispensing liquids under pressure comprising placing the liquid to be dispensed and a gas in a separate container under pressure, then lowering the pressure of said gas by transferring a portion of said gas to the receptacle to be filled thereby establishing a difference in pressure between said liquid upon one hand and said gas in said receptacle and container upon the other hand, then dispensing said liquid into said receptacle due to said difference in pressure, and then returning said gas from said receptacle to said container to reestablish substantially the original pressure of said gas thereby placing the system in condition for filling another receptacle with liquid.

8. A process for dispensing liquids under pressure comprising placing the liquid to be dispensed and a gas in a separate container under pressure, then lowering the pressure of said gas by transferring a portion of said gas to the receptacle to be filled thereby establishing a difference in pressure between said liquid upon one hand and said gas in said receptacle and container upon the other hand, then dispensing said liquid into said receptacle due to said difference in pressure, and then forcing said gas in said receptacle back to said container due to displacement thereof by said liquid to build up the pressure of gas in said container to substantially the original pressure.

EUGÈNE CHARMAT.